June 5, 1956  N. W. SUMMERS ET AL  2,748,556
REEL STRUCTURE FOR AGRICULTURAL HARVESTER
Filed Nov. 24, 1953
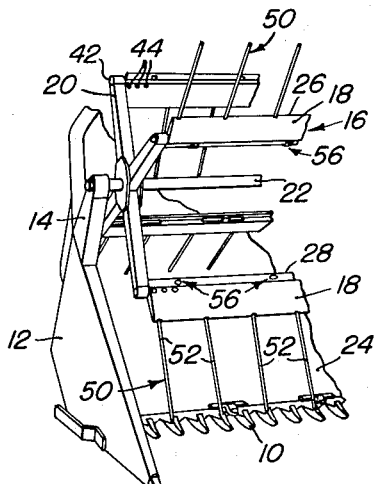
FIG. 1
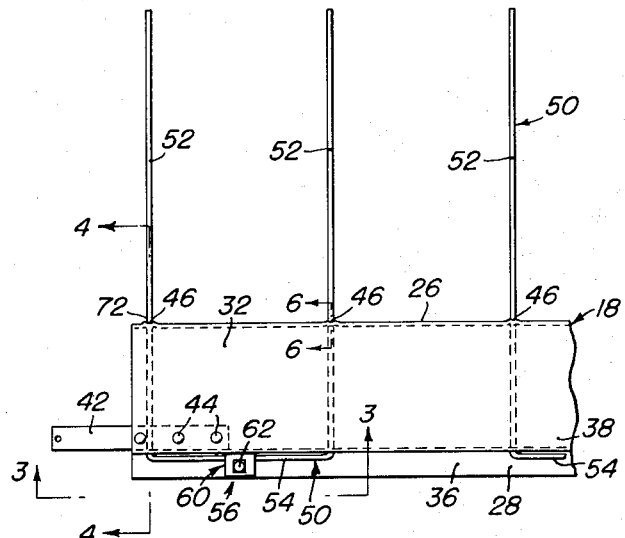
FIG. 2
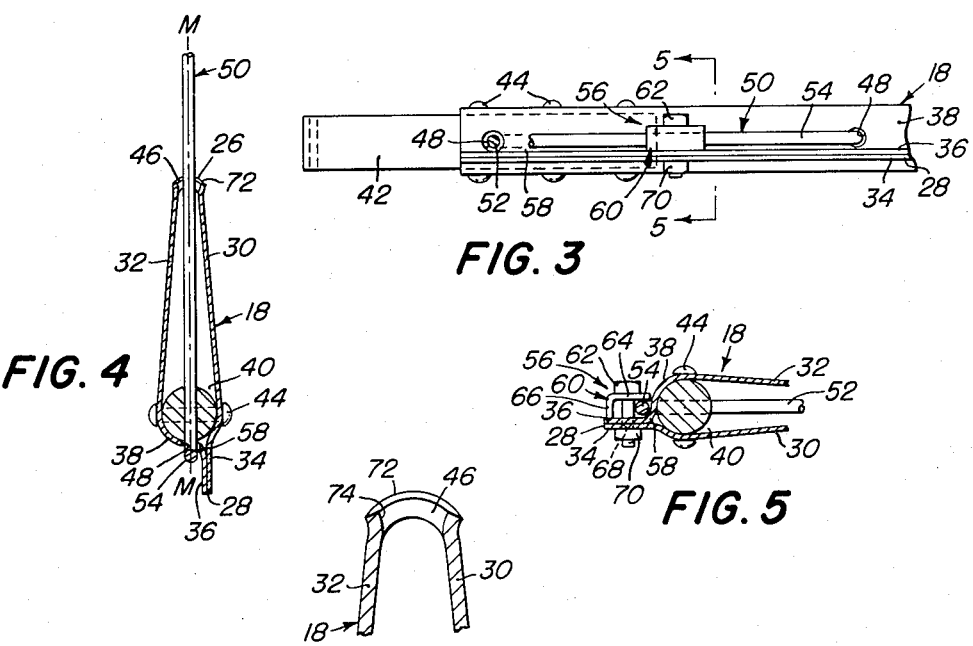
FIG. 3
FIG. 4
FIG. 5
FIG. 6
INVENTORS
N. W. SUMMERS
&
A. B. SKROMME
ATTORNEYS United States Patent Office 2,748,556
Patented June 5, 1956

2,748,556
REEL STRUCTURE FOR AGRICULTURAL HARVESTER

Neil W. Summers and Arnold B. Skromme, Ottumwa, Iowa, assignors to Deere Manufacturing Co., Dubuque, Iowa, a corporation of Iowa Application November 24, 1953, Serial No. 394,013

3 Claims. (Cl. 56—400)

This invention relates to a crop-handling device and more particularly to an improved support or carrier having a plurality of tines or fingers.

In agricultural harvesters, particularly those of the type in which the crop must be moved from one place to another on the ground during the harvesting or gathering operation, it is conventional to use a rotary member made up of a plurality of circumferentially spaced bars having crop-engaging fingers or tines projecting therefrom. Typical of these machines are the side-delivery rake and the harvester in which the rotary device takes the form of a reel operating in conjunction with a cutter bar, the purpose of the reel being to sweep rearwardly to lay the standing crop between the guards or fingers of the cutting mechanism. As respects harvester reels, the ordinary reel will operate without fingers, but special reels having fingers are provided as common practice for handling different types of crops in circumstances somewhat different from the ordinary.

It is one of the principal objects of the present invention to provide an improved carrier or support for use in a rotary device of the general character mentioned. It is an important object to provide the carrier or support in the form of an elongated tubular member having a somewhat oval cross section made up of a pair of opposed dished walls providing the member with a hollow interior. Preferably, the member is formed of one piece, folded midway between its ends to present a longitudinal folded edge and a pair of longitudinal flanged edges, the latter being brought together in offset relationship to the median plane of the member to provide room for a plurality of spaced apertures, which apertures are alined with similarly spaced apertures in the folded edge. Tines or fingers are inserted through sets of alined apertures and project beyond the folded edge. Another important object is the mounting of the fingers by removable securing means. The flanged edges are preferably spot-welded together, giving the carrier a box-section of high strength and presenting a substantial crop-engaging area which is of particular significance when the carrier is used as a component of a harvester reel.

The foregoing and other important objects and desirable features inherent in and encompassed by the invention will become apparent as a preferred embodiment of the invention is disclosed in detail in the following detailed specification and accompanying sheet of drawings, the several figures of which will be described immediately below.

Fig. 1 is a fragmentary perspective view of the right-hand front portion of a representative harvester.

Fig. 2 is a fragmentary elevational view of one of the carrier members and its tines, drawn to an enlarged scale and showing only one end portion of the structure.

Fig. 3 is an enlarged view as seen along the line 3—3 of Fig. 2.

Fig. 4 is a view drawn substantially to the scale of Fig. 3 and representing a section on the line 4—4 of Fig. 2.

Fig. 5 is a fragmentary sectional view, drawn to the scale of Figs. 3 and 4, and representing a section on the line 5—5 of Fig. 3.

Fig. 6 is a fragmentary sectional view as seen along the line 6—6 of Fig. 2 and drawn to substantially twice the scale of that of Figs. 3, 4, and 5.

In Fig. 1, the right-hand forward portion of a representative harvester will be recognized by such components as a transverse cutting mechanism 10, an outer divider 12, a reel support 14 and a reel 16. The reel comprises a plurality of carriers or support members in the form of bats 18 carried at each of its opposite ends (only one end of each being shown) by a reel spider 20 journaled on a central shaft 22 by means of the reel support 14. As is conventional, the reel rotates in a clockwise direction, as viewed from the right-hand side of the machine, to engage crops and sweep them into the cutting mechanism 10 and thence onto a rearwardly directed platform 24.

Since each of the several reel bats or carrier elements is identical to any other, only one will be described.

Although only a fragmentary portion of each member 18 is shown, it will be understood that each is of elongated structure, according to the width of the cutting mechanism 10, which may be anywhere from four to seven feet. The carrier member is of generally tubular section having first and second parallel lengthwise edges 26 and 28, being preferably formed from a single sheet of rigid material folded substantially in half to provide a lengthwise fold that establishes the first edge 26. The sheet when folded further provides a pair of opposed walls 30 and 32 integral with the folded edge 26 and extending in closely spaced apart relationship from said folded edge respectively at opposite sides of a longitudinal median plane M—M to marginal portions 34 and 36 along or adjacent to the opposite edge 28 of the member 18. The walls 30 and 32 are dished outwardly as respects each other to provide the member 18 with a hollow interior and the wall 32 adjacent its marginal portion 36 is offset at 38 across the median plane M—M to dispose the marginal edge portion 36 at the same side of the median plane as the marginal portion 34. These marginal portions overlap each other to form a double thickness along the edge 28 of the member.

The member 18 thus has a somewhat oval or flattened tubular section, being narrower along its longitudinal edge 26 and wider in a zone parallel to the opposite edge 28, the walls 30 and 32 diverging from the fold 26 to the enlarged portion just described. This portion provides at each of the opposite ends of the member 18 a shaft-receiving pocket 40 into which is inserted a stub shaft 42. Although the pocket at the opposite end of the member is not shown, it will be understood that it is in longitudinal alinement with the pocket illustrated and that the other stub shaft is coaxial with the stub shaft 42. The stub shaft is rigidly secured in place in the pocket 40 by securing means here shown as comprising a plurality of rivets 44. The stub shafts provide means for journaling the member 18 in the reel spider 20, as well as in the spider (not shown) at the other end of the harvester platform 24.

The folded edge 26 is provided lengthwise thereof with a plurality of spaced apertures 46 and the offset wall or marginal portion 38 is provided with a similar plurality of apertures 48. These apertures are preferably arranged in pairs and are of course respectively alined to receive a plurality of fingers or tines respectively on a plurality of U-shaped tine members, each designated generally by the numeral 50. Each tine member comprises a pair of legs 52 and a cross-connecting bight 54. Each tine member is installed in the member 18 by passing the legs or fingers 52 thereof through the member 18 from the edge 28 to the edge 26, the legs passing respectively through the alined apertures 48 and 46 and projecting in a radial direction as respects the center of the reel, so that the legs have substantial length beyond the longitudinal edge 26 of the member 18. The provision of the tine members in the form of U's facilitates manufacture and assembly and the bight 54 of each tine member enables the member to be easily installed in and secured to the member 18.

The securing means for accomplishing the mounting of each U-shaped member 50 serves also as means for joining the flanged or marginal edges 34 and 36 together. Accordingly, each member has a plurality of securing means, each designated generally by the numeral 56. The offset portion 38 of the wall 32 joins its integral marginal flange 36 in a small radius or fillet 58 in which the bight 54 of the associated tine member 50 is received or nested. Thus, there is afforded line contact between the bight and the carrier in the zone just described, which adds materially to the rigid support of the bight portion of the tine member, while leaving the fingers 52 relatively resilient in a manner that will be presently described.

Each securing means comprises an L-shaped clip 60 apertured to receive a bolt 62 and having angularly related legs 64 and 66 respectively engaging the bight 54 and the marginal flange 36. The longitudinal double thickness portion provided by the abutting or overlapping marginal flanges 34 and 36 is apertured at 68 (dotted lines in Fig. 5) to receive the bolt 62 and each bolt has threaded thereon a nut 70 which may be drawn up to secure the tine member 50 to the member 18. Joining of the marginal flanges 34 and 36 is achieved by spot-welding. The securing means 56 add to the strength of the member 18.

Each of the apertures 46 in the folded edge 26 of the member 18 is shaped so as to accommodate movement of its associated tine 52 as the tine flexes in operation. Accordingly, the portion of the member 18 in the zone of the fold and encircling the aperture 46 is flared axially and radially outwardly as respects the axis of the aperture (Fig. 6) to provide a circumferential mouth 72 having a rounded interior periphery 74 that affords a relatively smooth annular bearing area for the associated tine 52. Thus, sharp edges in the zone just referred to are eliminated and undesirable stresses on the tines 52 are avoided. That is to say, there are no sharp edges over which the tine members will be bent as they flex in operation.

The construction just described affords a relatively inexpensive and easily constructed carrier member or bat element, comprising comparatively few parts as represented by the main member 18, the plurality of tine members 50, the securing means 56 and the stub shafts 42 and the mounting rivets 44 therefor. Because of the relatively few parts, the components may be readily assembled and the tine members may be easily replaced in the field in the event of breakage or destructive bending.

Other features of the invention not specifically enumerated herein will undoubtedly occur to those versed in the art, as will numerous modifications and alterations in the preferred embodiment of the invention illustrated, all of which may be achieved without departure from the spirit and scope of the invention.

What is claimed is:

1. An agricultural crop-handling element of the character described, comprising: an elongated carrier member of generally tubular section having first and second parallel lengthwise edges and formed from a sheet of rigid material folded substantially in half to provide a lengthwise fold establishing the first edge of the carrier member, and to provide further a pair of walls integral with and extending in closely spaced apart relationship from the fold respectively at opposite sides of the longitudinal median plane of the fold and marginal portions along the second edge of the carrier member, one of said walls adjacent its marginal portion being formed with an offset portion extending across the median plane and adjoining said marginal portion in a lengthwise fillet at the same side of the median plane as the other marginal portion, said marginal portions overlapping each other to form a double-thickness along said second edge of the carrier member; said fold having a plurality of pairs of apertures therethrough spaced lengthwise of the carrier member and opening into the space between the walls; said offset wall portion likewise having a similar plurality of apertures therethrough spaced lengthwise of the carrier member on the order of and respectively alined with the fold apertures to provide a plurality of sets of apertures adjacent to the aforesaid fillet, each set including a pair of fold apertures and an alined pair of offset portion apertures; a plurality of U-shaped tine members, one for each set of apertures, having their legs passed respectively through said sets from the second edge of the carrier member, with their bights lying lengthwise along and nested in said fillet and with their legs projecting through the fold apertures and beyond the first edge of the carrier member; and a plurality of securing members respectively engaging the bights of the tine members and the marginal portions establishing the aforesaid double thickness and securing said bights and marginal portions together.

2. The invention defined in claim 1, in which: the portion of the fold encircling each fold aperture is flared axially and radially outwardly as respects the axis of said aperture to provide a circumferential mouth having a rounded interior periphery affording a relative smooth annular bearing area for the associated leg of the respective tine member.

3. The invention defined in claim 1, in which: the walls, at least at opposite ends of the carrier member, diverge from the fold to provide enlarged and lengthwise alined pocket portions opening lengthwise and outwardly at said opposite ends; and a pair of coaxial stub shafts secured to the carrier member, one in and projecting from each pocket portion.

References Cited in the file of this patent

UNITED STATES PATENTS

| | | |
|---|---|---|
| 982,072 | Kullander | Jan. 17, 1911 |
| 1,497,526 | Martin | June 10, 1924 |
| 1,652,260 | Thompson | Dec. 13, 1927 |
| 2,075,220 | Neuhausen | Mar. 30, 1937 |